May 8, 1956 R. C. GAUGER 2,745,059
DEVICE FOR MEASURING GAS PRESSURES
Filed May 3, 1952 2 Sheets-Sheet 1

ROY C. GAUGER
INVENTOR.

BY *Hora S. Woodruff*
*George W. Petersen*
ATTORNEYS

May 8, 1956 R. C. GAUGER 2,745,059
DEVICE FOR MEASURING GAS PRESSURES
Filed May 3, 1952 2 Sheets-Sheet 2

ROY C. GAUGER
INVENTOR.

BY
ATTORNEYS

United States Patent Office 2,745,059
Patented May 8, 1956

2,745,059

DEVICE FOR MEASURING GAS PRESSURES

Roy C. Gauger, Rochester, N. Y., assignor, by mesne assignments, to Consolidated Electrodynamics Corporation, Pasadena, Calif., a corporation of California Application May 3, 1952, Serial No. 285,959

19 Claims. (Cl. 324—33)

This invention relates to devices for measuring gas pressure and is particularly concerned with cold cathode vacuum gauges.

Accurate pressure measuring devices are a necessary adjunct to vacuum technology, particularly in the range below 1 mm. Hg pressure. The so-called ionization gauges have come into widespread use for pressure measurement, but a limitation on most gauges is their sensitivity over only a relatively narrow pressure range. One of the types of ionization gauges which has been used successfully for accurate pressure measurements in the pressure range below about 10 microns Hg is the cold cathode type gauge such as is described by Penning in U. S. Patent 2,197,079. In a gauge of this kind, a current discharge between paired electrodes is deflected by a magnetic field to lengthen the path of the electrons and thus cause a higher degree of positive ion formation, and the intensity of the discharge current is measured as a function of the pressure of the gas in the discharge space.

It is accordingly an object of this invention to provide an improved vacuum gauge of the cold cathode type.

It is a further object of the invention to provide a cold cathode gauge having good sensitivity over substantially the entire pressure range below about 400 microns Hg.

It is another object of the invention to greatly extend the range of a cold cathode gauge of the type wherein a current discharge takes place in a magnetic field and the gas pressure is measured by determining the current intensity of the cold cathode discharge.

Another object of the invention is to provide an improved cold cathode discharge device which is self-cleaning during operation.

Another object of the invention is to provide a cold cathode discharge tube of improved construction.

Other objects will be apparent from the drawings and from the description and claims which follow.

These and other objects are attained by means of this invention as described hereinafter with particular reference to a preferred embodiment of the invention as illustrated by the drawings.

Figures 1, 2:
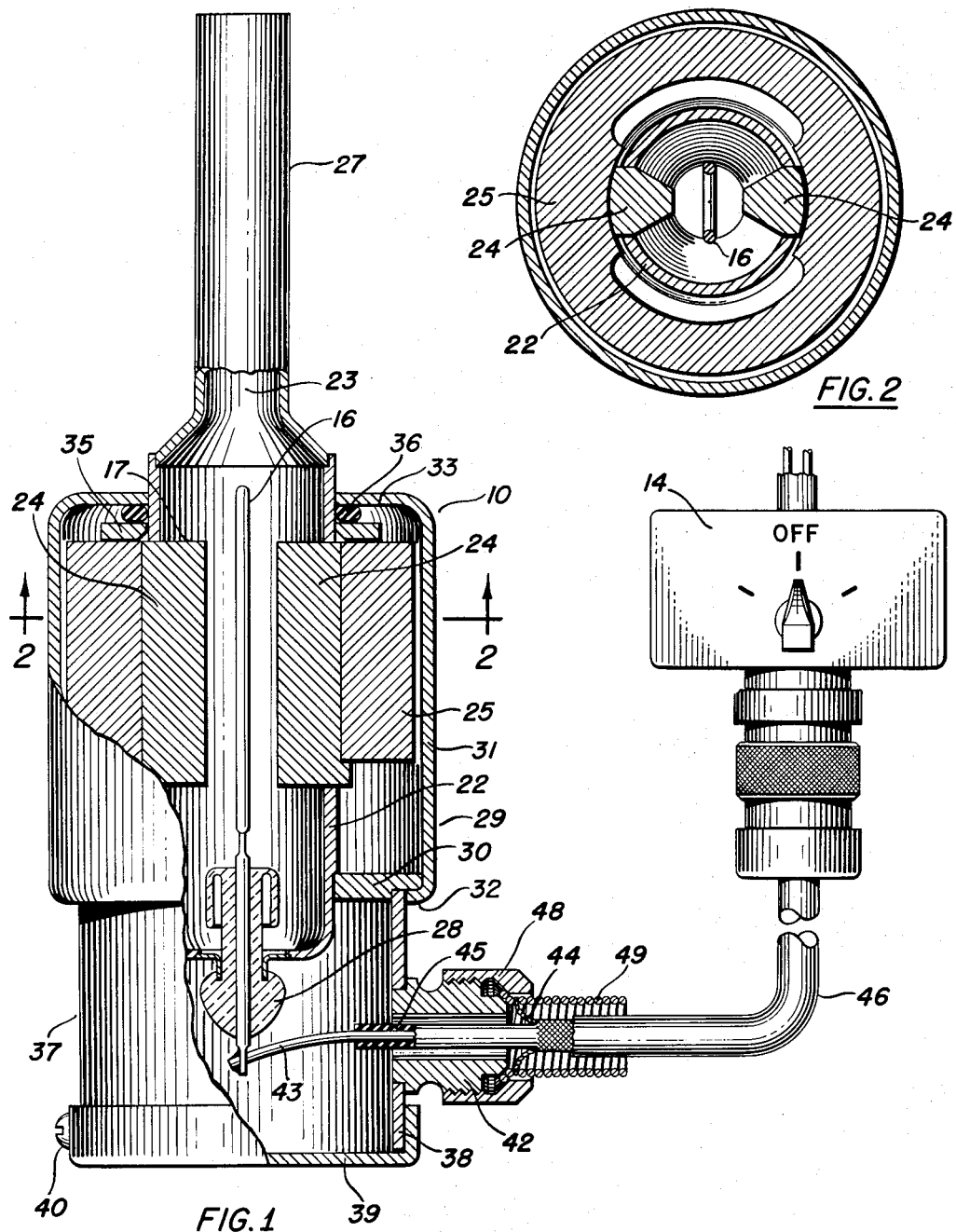
Fig. 1 is a view in elevation, partly broken away and in section, of a cold cathode discharge device constituting a preferred embodiment of the inveniton.
Fig. 2 is a section taken along line 2—2 of Fig. 1.

The vacuum gauge assembly embodying the invention in general comprises a cold cathode discharge tube adapted to be connected to an evacuated system, a preferred embodiment of the discharge tube being described more fully hereinafter, a meter connected into an electrical circuit with the discharge tube and arranged for measuring the intensity of the discharge current, current leads connecting the electrodes of the discharge tube into the electrical circuit, means for connecting the circuit to a current source and means for reversing the polarity of the electrodes during operation of the gauge for reasons which will appear hereinafter.

In a conventional vacuum gauge of the cold cathode discharge type wherein the discharge is effected under the influence of a magnetic field (commonly known as a Phillips gauge), the discharge tube comprises an envelope provided with an opening for the introduction of the gas to be measured, a cathode consisting of two opposed plates inside the envelope, a magnet arranged to produce a beam of magnetic lines of force across the discharge space from one cathode plate to the other cathode plate, and a loop anode mounted generally midway between the cathode plates and encircling the beam of magnetic lines of force. In such a discharge tube, electrons leaving one cathode plate are deflected from their normal path, which would be directly to the anode, and instead travel in a helical path towards the opposing cathode plate where they are repelled towards the first plate again. Gradually such electrons find their way to the anode but, in so doing, they travel a distance many times greater than their ordinary free path and the chances of a collision with a gas molecule to form a positive ion are greatly increased.

The intensity of the discharge current is measured by a suitable ammeter in the gauge circuit, the meter readings being converted to pressure units by reference to the usual calibration curves. Alternatively, a calibrated scale is employed on the meter for direct reading of the discharge current intensity in terms of pressure. A gauge of this kind as constructed heretofore had good sensitivity in the pressure range below about 10 microns Hg but had limited sensitivity at higher pressures. Consequently, it was necessary prior to this invention to employ another type of gauge operable in the higher pressure ranges in conjunction with the cold cathode discharge gauge when pressure determinations were desired over the entire range below about 400 microns Hg.

I have now discovered that, in a cold cathode discharge gauge of the type employing a magnetic field to deflect the electron path and having a cathode of substantially greater area than the anode, the sensitivity and operating range of the gauge is greatly extended and the gauge is operable in the range from about 10 to about 400 microns Hg pressure when the polarity of the electrodes is reversed. Thus, by employing the larger electrode as cathode and the smaller electrode as anode as in conventional cold cathode gauges, the gauge is operable in the pressure range below 10 microns Hg; and by reversing the polarity of the electrodes by suitable switch means, the gauge is operable in the range from 10 to 400 microns Hg. The gauge embodying the invention has the further advantage of being self-cleaning during operation. Reversing the polarity of the electrodes causes ionic cleanup of sputtered material which tends to contaminate the usual cold discharge tube and which might give erroneous pressure readings due to outgassing of the sputtered material.

Figure 3:
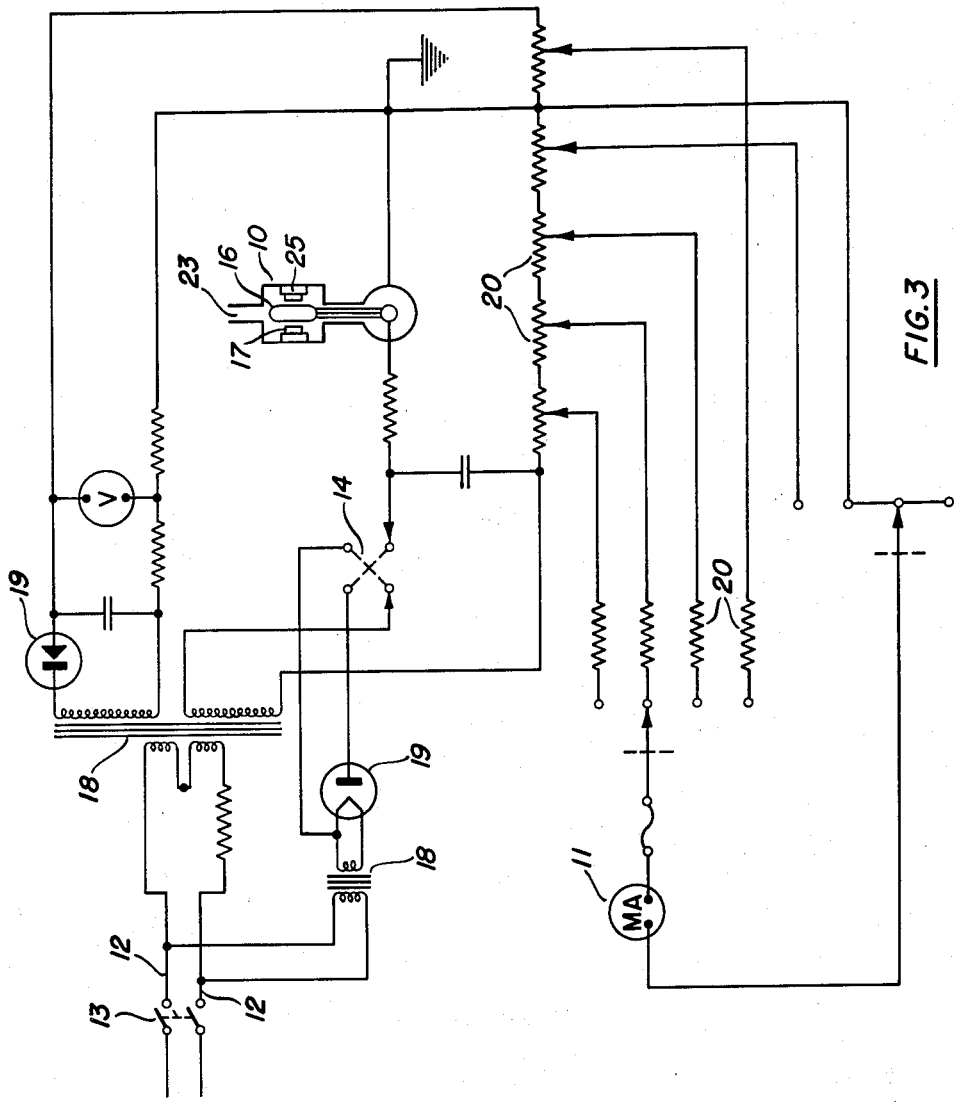
Fig. 3 is a circuit diagram of apparatus embodying the invention.

In the gauge assembly embodying this invention as illustrated diagrammatically in Fig. 3, a cold cathode discharge tube 10 and a microammeter 11 are connected in parallel in a conventional circuit having leads 12, 12 which are connected to a 115 volt power circuit through an off-on switch 13. A reversing switch 14 is connected in the circuit between switch 13 and tube 10 and meter 11 for reversing the polarity of current supplied to the electrodes 16 and 17 of discharge tube 10. The usual transformers 18, 18 and rectifiers 19, 19 are included in the gauge circuit for establishing the required voltage for operation of the discharge tube. A series of resistances 20, 20 in the meter circuit permit operation of the meter over a wide current range with good sensitivity.

The cold cathode discharge tube 10 shown diagrammatically in Fig. 3 and detailed in Figs. 1 and 2, comprises an envelope 22 defining a discharge space and provided with an opening 23 for the introduction of the gas to be measured, a plate electrode 17 having two plate members 24, 24 facing each other across the discharge space within envelope 22, a magnet 25 positioned so as to establish a beam of magnetic lines of force across the discharge space from one plate member 24 to the other plate member 24 of electrode 17, and a loop electrode 16 mounted in the discharge space and encircling the beam of magnetic lines of force.

In a preferred embodiment, the cold cathode discharge tube 10 is constructed as illustrated in Figs. 1 and 2 of the drawings. In this preferred embodiment, the tube envelope 22 is a metal tube defining a cold cathode discharge space. One end of tube envelope 22 is sealed off and the other end is welded or otherwise secured to an elongated tubular neck 27 which is adapted to be connected to an evacuated system to be tested. Opening 23 through neck 27 permits entrance of the gas to be measured into the discharge space within envelope 22.

A ceramic insulator 28 mounted in the sealed end wall of envelope 22 serves as a mounting for the wire loop electrode 16 which is disposed in the discharge space and which has a lead out of the envelope through insulator 28. The other electrode 17, corresponding to the plate electrode in a conventional discharge tube, consists of two massive metal members 24, 24 mounted in openings in the wall of envelope 22 and each having a planar face generally parallel to the axis of the tube envelope and lying in a plane generally parallel to the plane of the electrode so that the electrode members 24, 24 are adapted to function as electrode plates facing each other across the discharge space. The electrode members 24, 24 are dimensioned such that they face each other through the loop electrode 16 throughout the extent of the electrode faces.

A magnet 25 encircles the tube envelope 22 and contacts the portions of electrode members 24, 24 which project outwardly through envelope 22. Members 24, 24 thus act as pole pieces for magnet 25 so as to produce a beam of magnetic lines of force across the discharge space from one member 24 to the opposite member 24 and through the loop in electrode 16. Magnet 25 is otherwise out of direct contact with tube envelope 22.

Magnet 25 in turn is enclosed in a metal jacket 29 which serves to protect the magnet. In the preferred embodiment, jacket 29 consists of an end wall 30 which is welded or otherwise secured to envelope 22 adjacent the closed end of the envelope and a tubular jacket wall proper 31 of metal, rubber or other suitable material enclosing the magnet 25 and the major portion of envelope 22. The jacket wall has one end margin 32 crimped around the end wall 30 and has the other end margin 33 turned inwardly against tube envelope 22 adjacent tube neck 27. A seal is provided at margin 33 by means of beveled ring 35 bearing on magnet 25 and O-ring 36 compressed between margin 33 and ring 35.

A cap housing 37 encloses the portion of insulator 28 which projects out through the sealed end of envelope 22 and in which the lead to loop electrode 16 is embedded. Housing 37 consists of a metal tube 38 welded or otherwise secured to the end wall 30 of jacket 29 and a removable cap 39 closing the unsecured end of tube 38, cap 39 being held in place by set screw 40.

A threaded nipple 42 is welded to the wall 38 of housing 37 and provides an inlet for the power lead to the loop electrode 16. The discharge tube is connected into the gauge circuit by leads 43 and 44 which connect the loop electrode 16 and the plate electrode 17 respectively to the reversing switch 14. In the preferred embodiment, lead 43 enters housing 37 through nipple 42 and is connected to the end of loop electrode 16 at insulator 28. Lead 43 is enclosed in a rubber or plastic insulating cover 45 and lead 44 consists of a woven wire jacket around insulating cover 45, both leads being encased in conduit 46. Woven wire lead 44 is preferably connected electrically to plate electrode 17 by spreading the end of lead 44 over nipple 42 which is of metal or other conductive material. Current can thus flow from lead 44 through nipple 42, housing 37 and tube envelope 22 to electrode members 24, 24, insulator 28 serving to insulate loop electrode 16 from electrical contact with the envelope 22. The end of woven lead 44 is pinned to nipple 42 by nipple cap 48 and spring 49.

Leads 43 and 44 encased in conduit 46 are connected to reversing switch 14 whereby either lead can be made positive and the other one negative. Thus, for example, loop electrode 16 can be connected into the power circuit and serve as anode as in conventional discharge tubes whereby the plate electrode members 24, 24 forming electrode 17 function as cathode members having substantially greater surface area than the loop electrode. By reversing the switch 14, loop electrode 16 can be made negative and function as cathode whereupon plate members 24, 24 function as anode. Reversing switch 14 is connected into the gauge circuit as illustrated in Fig. 3 and described hereinabove.

In operating the gauge assembly embodying the invention, the gauge circuit is connected to a conventional current source by means of leads 12, 12. The neck 27 of the discharge tube 10 is sealed into the system in which the gas pressure is to be measured. In evacuated systems, the diffusion of gas into envelope 22 is relatively rapid and the discharge space within envelope 22 rapidly reaches equilibrium with the system being tested. Assuming that the system being tested has been evacuated to a pressure below 10 microns Hg, reversing switch 14 is positioned to connect the loop electrode to the positive side of rectifier 19 whereby the loop electrode is positive and the plate electrode is negative, as in a conventional cold cathode discharge tube. In this condition, electrons leave the plate members 24, 24 and enter the discharge space. The beam of magnetic lines of force, which is directed across the discharge space normal to the face plane of the plate electrode members 24, 24 and hence at an angle to the shortest line from the plate electrode to the loop electrode, deflects the electrons from their normal path which would carry them directly to the loop electrode and instead causes the electrons to traverse a helical path towards the plate electrode member opposite to the one from which the electron was emitted. As the electrons approach the opposed plate member, they are, of course, repelled back towards their source. The electrons gradually find their way to the anode, but in so doing they traverse a much longer path than would ordinarily be the case in the absence of the magnetic field and hence the chance of collision with molecules of gas in the discharge space is greatly increased. Collisions between the electrons and the gas molecules produce positive ions which migrate to the cathode and give rise to the discharge current, the intensity of the discharge current thus being a function of the number of molecules of gas in the discharge space and hence a measure of the gas pressure in the system being tested. The current discharge is measured on microammeter 11 in the gauge circuit, the microammeter being desirably calibrated to give a direct reading in terms of pressure. The use of the usual resistances 20, 20 in conjunction with the microammeter permits sensitive readings over a wider range of current intensity than would be possible otherwise on a single meter. With the gauge operating in this fashion, pressures are measured with good sensitivity in the pressure range below about 10 microns Hg.

When it is desired to measure pressures in the system being tested at values higher than about 10 microns, switch 14 is reversed so that the loop electrode 16 which has the lesser surface area is connected to the negative side of rectifier 19 and hence becomes the cathode and the plate members 24, 24 having the greater surface area become the anode. In this operating condition, the gauge has good sensitivity over the range from about 10 microns to about 400 microns Hg. Thus the operating range of the gauge embodying this invention is much greater than conventional cold cathode discharge gauges, and the new gauge can be employed even up into the pressure range of mechanical pumps.

The reason why the gauge embodying the invention is successfully operable in this higher pressure range when the loop electrode is made negative is not understood since the theory as to how the gauge operates under these conditions is not clear at this time. The invention does, however, provide a gauge with excellent sensitivity over a wide pressure range. Furthermore, in a conventional cold cathode discharge tube, there is a gradual buildup of sputtered material which can affect the operation of the tube due to outgassing. Reversing the polarity of the electrodes causes ionic cleanup of the tube and hence it is self-cleaning.

The preferred construction of the discharge tube as illustrated in Figs. 1 and 2 provides a tube which is not readily subject to damage or breakage, and which permits ready connection of the discharge tube into the gauge circuit. Furtheremore, unlike prior discharge tubes, the magnet is not rigidly mounted in the tube envelope but is removably mounted inside the tube jacket and outside the tube envelope. The magnet is desirably mounted out of contact with the tube jacket so that the jacket does not collect iron filings, etc. from the work area, which might otherwise cling to the discharge tube. In the preferred embodiment, the tube jacket and envelope are also constructed of aluminum, copper or similar material to ensure against this condition. The mounting of the magnet between the tube walls has the further advantage that iron particles collecting inside the discharge space on the electrode plates can be removed by removing the tube jacket and the magnet and thereby demagnetizing the electrode plates.

In the present gauge as in prior cold cathode discharge gauges, best results are obtained by having the magnet and the electrodes so positioned that the beam of magnetic lines of force is at an angle of at least 40° from the shortest line between the electrode plate and the loop electrode. In addition, the loop electrode is so dimensioned as to encircle and lie outside the beam of magnetic lines of force.

Although the invention has been described in considerable detail with particular reference to a preferred embodiment thereof as illustrated in the drawings, it will be understood that variations and modifications can be effected within the spirit and scope of the invention as illustrated in the drawings, as described hereinabove and as defined in the appended claims.

I claim:

1. In a device for determining the pressure of a gas by measuring the current intensity produced by a cold cathode discharge taking place in the gas, a discharge tube comprising an envelope provided with an opening for the introduction of the gas, a pair of electrodes of substantially different surface area spaced from each other across a discharge space within said envelope, means for producing magnetic lines of force in said discharge space at an angle to the shortest distance between said electrodes, means for energizing said electrodes at opposite polarities and means for reversing the polarity of said electrodes.

2. In a device for determining the presure of a gas by measuring the current intensity produced by a cold cathode discharge taking place in the gas, a discharge tube comprising an envelope provided with an opening for the introduction of the gas, an electrode divided into two facing spaced-apart portions arranged when energized to have the same polarity, a second electrode of relatively smaller area than said first-named electrode positioned generally between said portions and arranged to have a different polarity than said portions, means for producing magnetic lines of force in the space between said electrodes and at an angle to the normal electrical lines of force between said electrodes, means for energizing said electrodes and means for reversing the polarity of said electrodes.

3. In a device for determining the pressure of a gas by measuring the current intensity produced by a cold cathode discharge taking place in the gas, a discharge tube comprising an envelope provided with an opening for the introduction of the gas, an electrode having two parallel portions facing each other across a discharge space, each of said portions being arranged to have the same polarity when energized, magnet means arranged for producing a beam of magnetic lines of force from one said portion to the other said portion across said space, a loop electrode of substantially lesser surface area than said first-named electrode disposed in said space and encircling said beam, said loop electrode being outside said beam and being arranged to have a polarity opposite to said first-named electrode, means for connecting said electrodes to a current source, and means for regulating the current flow to impart a positive polarity to said loop electrode and a negative polarity to said first-named electrode for measurements in a low pressure range and for reversing the polarity of said electrodes for measurements in a higher pressure range.

4. In a device for determining the pressure of a gas by measuring the current intensity produced by a cold cathode discharge taking place in the gas, a discharge tube comprising a double-walled envelope provided with an opening for the introduction of the gas into the space within the inner wall of said envelope, an electrode having two spaced-apart parallel portions facing each other across the space within the inner wall of said envelope, each of said portions being arranged to have the same polarity as the other portion when energized, magnet means disposed between the walls of said envelope and arranged for producing a beam of magnetic lines of force from one said electrode portion to the other said electrode portion across the space between said portions, a loop electrode of substantially lesser surface area than said first-named electrode and arranged to have an opposite polarity disposed in said space within said inner wall and encircling the beam of magnetic lines of force between said electrode portions, means for energizing said electrodes, and means for reversing the polarity of said electrodes when the pressure being measured is outside the operable range of said device at the initial polarities.

5. In a device for determining the pressure of a gas by measuring the current intensity produced by a cold cathode discharge taking place in the gas, a discharge tube comprising an inner generally cylindrical member and an outer cylindrical member secured together in generally concentric relation and forming a double-walled envelope, said inner cylindrical member defining a discharge space and being provided with an opening for the introduction of a gas into said discharge space, an electrode comprising two parallel portions in electrical contact with said inner member and facing each other across said discharge space, said portions being arranged to have the same polarity when energized, magnet means disposed in the space between said inner member and said outer member, said magnet means and said electrode portions being arranged in combination for producing a beam of magnetic lines of force across said discharge space from one said electrode portion to the other said electrode portion, a loop electrode mounted in said discharge space and lying in a plane generally normal to said beam of magnetic lines of force and generally intermediate said electrode portions, said loop electrode being of substantially lesser surface area than said first-named electrode and being arranged to have a polarity opposite to said first-named electrode, said loop electrode lying outside said beam of magnetic lines of force and encircling said beam, and means for connecting said electrodes to a source of energizing current including means for reversing the polarity of said electrodes when the pressure being measured is outside the operating range of the device under the then existing polarity condition.

6. In a device for determining the pressure of a gas by measuring the current intensity produced by a cold cathode discharge taking place in the gas, a discharge tube comprising an inner generally cylindrical member and an outer generally cylindrical member secured together in generally concentric relation and forming a double-walled envelope, said inner member defining a discharge space and being provided with an opening for the introduction of a gas into said space, an electrode comprising two parallel portions facing each other across said discharge space, each said electrode portion projecting through said inner member into the space between said inner member and said outer member and into said discharge space, magnet means disposed in the space between said inner member and said outer member and encircling said inner member, said magnet means being in contact with said electrode portions, said electrode portions forming pole extensions for said magnet means to produce a beam of magnetic lines of force across said discharge space from one said portion to the other said portion, a loop electrode of substantially lesser surface area than said first-named electrode mounted in said discharge space and lying in a plane generally normal to said beam of magnetic lines of force and generally intermediate said electrode portions, said loop electrode encircling said beam of magnetic lines of force between said electrode portions, means for energizing said first-named electrode and said loop electrode at opposite polarities, and means for causing said loop electrode to have a positive polarity and said first-named electrode to have a negative polarity when operating at a pressure below about 10 microns Hg and for causing said loop electrode to have a negative polarity and said first-named electrode to have a positive polarity when operating at a pressure above about 10 microns Hg.

7. A cold cathode gauge for determining gas pressure comprising a discharge tube envelope adapted to be filled with the gas to be measured, a pair of electrodes of substantially different surface area spaced from each other across a discharge space within said envelope, means for producing a beam of magnetic lines of force in said discharge space at an angle to the shortest distance between said electrodes, means for producing a discharge between said electrodes and including means for reversing the polarity of said electrodes when the pressure to be measured is outside the operable range of the gauge at the then-existing polarity, and means for measuring the intensity of the discharge current.

8. A cold cathode gauge for determining gas pressure comprising a discharge tube envelope provided with an opening for the introduction of the gas to be measured, said envelope defining a discharge space, an electrode comprising two spaced-apart portions facing each other across said discharge space, a second electrode in said discharge space and having substantially less surface area than said first-named electrode, means for producing a beam of magnetic lines of force between said portions and at an angle to the normal electrical lines of force between said electrodes, means for energizing said electrodes at opposite polarities to produce a discharge between said electrodes, means for reversing the polarity of said electrodes when the pressure to be measured is outside the operable range of said gauge at the then-existing polarity, and means for determining the pressure of the gas in said tube envelope including means for measuring the intensity of the discharge current.

9. A cold cathode gauge for determining gas pressures substantially throughout the range below 400 microns Hg, said gauge comprising a discharge tube envelope provided with an opening for the introduction of the gas to be measured, said envelope defining a discharge space, an electrode comprising two parallel portions facing each other across said discharge space, magnetic means arranged to produce a beam of magnetic lines of force across said discharge space from one said electrode portion to the other said electrode portion, a loop electrode of substantially less surface area than said first-named electrode mounted in said discharge space generally intermediate said electrode portions and encircling said beam of magnetic lines of force, means for causing a discharge between said electrodes including means for imparting a negative polarity to said first-named electrode and a positive polarity to said loop electrode in the pressure range below about 10 microns Hg and including means for reversing the polarity of said electrodes in the pressure range above about 10 microns Hg, and means for determining the pressure of the gas in said tube envelope including means for measuring the intensity of the discharge current.

10. A cold cathode gauge for measuring gas pressures throughout the range below 400 microns Hg, said gauge comprising a double-walled discharge tube envelope, the inner wall of said discharge tube defining a discharge space, said envelope having an opening for the introduction of the gas to be measured into said discharge space, an electrode having two spaced-apart parallel portions facing each other across said discharge space, magnet means disposed between the walls of said envelope and arranged for producing a beam of magnetic lines of force from one said electrode portion to the other said electrode portion across said discharge space, a loop electrode of substantially less surface area than said first-named electrode disposed in said discharge space generally intermediate said electrode portions and encircling said beam of magnetic lines of force, means connecting said electrodes in an electric circuit for causing a discharge between said electrodes, reversing switch means in said circuit for changing the operable pressure range of said gauge by reversing the polarity of said electrodes, and means for measuring the intensity of the discharge current, said first-named electrode being arranged to function as cathode and said loop electrode as anode at pressures below about 10 microns Hg and said electrodes being arranged for having their polarity reversed above about 10 microns Hg.

11. A cold cathode gauge for determining gas pressures substantially throughout the range below 400 microns Hg, said gauge comprising a generally cylindrical inner member and a generally cylindrical outer member secured together in generally concentric relation and forming a double-walled discharge tube envelope, said inner member defining a discharge space, said envelope being provided with an opening for the introduction into said discharge space of the gas to be measured, an electrode comprising two parallel portions facing each other across said discharge space, each said electrode portion being mounted in a wall opening in said inner member, magnet means disposed in the space between said inner member and said outer member and encircling said inner member, said magnet means being in contact with said electrode portions and being arranged for producing a beam of magnetic lines of force from one said electrode portion to the other said electrode portion across said discharge space, a loop electrode of substantially less surface area than said first-named electrode mounted in said discharge space generally intermediate said electrode portions and encircling said beam of magnetic lines of force, means for energizing said first named electrode and said loop electrode at opposite polarities to cause a discharge between said electrodes, means for reversing the polarity of said electrodes when the pressure range being measured is outside the operable range of said gauge at the existing polarity, and means for measuring the intensity of the discharge current between said electrodes and thereby determining the pressure of the gas in said discharge space.

12. In a device for determining the pressure of a gas in the range from about 10 to 400 microns Hg by measuring the current intensity produced by a cold cathode discharge taking place in the gas, a discharge tube comprising an envelope provided with an opening for the introduction of the gas, a pair of electrodes of substantially different surface area spaced from each other across a discharge space within said envelope, means for producing magnetic lines of force in said discharge space at an angle to the shortest distance between said electrodes, means for imparting a positive polarity to the electrode having the greater surface area and for imparting a negative polarity to the electrode having the lesser surface area, and means for measuring the current discharge between said electrodes.

13. In a device for determining the pressure of a gas in the range from about 10 to 400 microns Hg by measuring the current intensity produced by a cold cathode discharge taking place in the gas, a discharge tube comprising an envelope provided with an opening for the introduction of the gas, an anode divided into two facing spaced-apart portions, a cathode of lesser surface area than said anode and being positioned generally between said anode portions, and means for producing a beam of magnetic lines of force across the space from one anode portion to the other anode portion at an angle to the normal electron path between said cathode and said anode.

14. In a device for measuring the pressure of a gas in the range from about 10 to 400 microns Hg by the current intensity produced by a cold cathode discharge taking place in the gas, a discharge tube comprising an envelope provided with an opening for the introduction of the gas, an anode divided into two portions facing each other across a discharge space within said envelope, magnet means arranged for producing a beam of magnetic lines of force across said discharge space from one said anode portion to the other said anode portion, and a loop cathode of substantially lesser surface area than the surface area of said anode disposed in said discharge space between said anode portions and encircling said beam of magnetic lines of force.

15. A cold cathode discharge gauge for determining gas pressures in the range from about 10 to 400 microns, said gauge comprising a discharge tube envelope adapted to be filled with the gas to be measured, an anode comprising two spaced-apart portions facing each other across a discharge space within said envelope, a magnet arranged for producing a beam of magnetic lines of force across said discharge space from one said anode portion to the other said anode portion, a loop cathode of substantially lesser surface area than said anode mounted in said discharge space and encircling said beam of magnetic lines of force, means for energizing said anode and cathode, and means for measuring the intensity of the discharge current.

16. A cold cathode discharge tube comprising a tube envelope of conductive material defining a discharge space, one end of said tube envelope being closed, the other end of said envelope being provided with an opening for the introduction of gas into said envelope, an insulator mounted in the closed end of said envelope and extending through the wall of said envelope, a loop electrode disposed in said discharge space and having a lead extending out of said envelope through said insulator, a second electrode of substantially greater surface area than said loop electrode and comprising two electrode portions mounted in wall openings in said tube envelope and facing each other through the loop in said loop electrode, said electrode portions being in electrical contact with said tube envelope, a magnet disposed outside said tube envelope and contacting said electrode portions, a conductive tube jacket mounted on said tube envelope and encasing said magnet, means for connecting an electrical lead to said tube envelope for energizing said electrode portions, and means for measuring the intensity of the current discharge between said electrodes.

17. In a device for determining the pressure of a gas by measuring the current intensity produced by a cold cathode discharge taking place in the gas, a discharge tube comprising an envelope provided with an opening for the introduction of the gas, a pair of electrodes of substantially different surface area spaced from each other across a discharge space within said envelope, means for producing magnetic lines of force in said discharge space at an angle to the shortest distance between said electrodes, means for energizing said electrodes at opposite and substantially constant polarities and means for reversing the polarity of said electrodes.

18. In a device for determining the pressure of a gas by measuring the current intensity produced by a cold cathode discharge taking place in the gas, a discharge tube comprising an envelope provided with an opening for the introduction of the gas, an electrode divided into two facing spaced-apart portions arranged when energized to have the same polarity, a second electrode of relatively smaller area than said first-named electrode positioned generally between said portions and arranged to have a different polarity than said portions, means for producing magnetic lines of force in the space between said electrodes and at an angle to the normal electrical lines of force between said electrodes, means for energizing said electrodes at substantially constant and opposite polarities, and means for reversing the polarity of said electrodes.

19. In a device for determining the pressure of a gas by measuring the current intensity produced by a cold cathode discharge taking place in the gas, a discharge tube comprising an envelope provided with an opening for the introduction of the gas, an electrode having two parallel portions facing each other across a discharge space, each of said portions being arranged to have the same polarity when energized, magnet means arranged for producing a beam of magnetic lines of force from one said portion to the other said portion across said space, a loop electrode of substantially lesser surface area than said first-named electrode disposed in said space and encircling said beam, said loop electrode being outside said beam and being arranged to have a polarity opposite to said first-named electrode, means for regulating the current flow to impart a positive polarity to said loop electrode and a negative polarity to said first-named electrode for measurement in a low pressure range and for connecting said electrodes to a substantially direct current source, and means for reversing the polarity of said electrodes for measurements in a higher pressure range.

References Cited in the file of this patent
UNITED STATES PATENTS

| | | |
|---|---|---|
| 2,485,754 | Le Poole | Oct. 25, 1949 |
| 2,490,468 | Picard | Dec. 6, 1949 |
| 2,506,431 | Perret et al. | May 2, 1950 |
| 2,577,066 | Arnold | Dec. 4, 1951 |